(12) United States Patent
Schutt et al.

(10) Patent No.: US 6,703,739 B1
(45) Date of Patent: Mar. 9, 2004

(54) POWERTRAIN WITH MOTOR GENERATOR ROTOR HAVING TORQUE TRANSMISSION MOUNTING RING

(75) Inventors: Eric Brian Schutt, Oxford, MI (US); Keith D. Van Maanen, Bloomfield Hills, MI (US); Addison T. Solak, Ypsilanti, MI (US)

(73) Assignee: General Motors Corporation, Detroit, MI (US)

(*) Notice: Subject to any disclaimer, the term of this patent is extended or adjusted under 35 U.S.C. 154(b) by 23 days.

(21) Appl. No.: 10/226,182

(22) Filed: Aug. 22, 2002

(51) Int. Cl.[7] ............................................. H02K 49/00
(52) U.S. Cl. ................................. 310/96; 310/89
(58) Field of Search ............................. 310/96, 75 C, 310/113, 103, 89, 118; 180/165; 123/179.1

(56) References Cited

U.S. PATENT DOCUMENTS

| | | | | |
|---|---|---|---|---|
| 4,346,773 A | * | 8/1982 | Hofbauer et al. | 180/165 |
| 4,421,998 A | * | 12/1983 | Ahner et al. | 310/68 R |
| 4,958,095 A | * | 9/1990 | Uchida et al. | 310/59 |
| 5,103,127 A | | 4/1992 | Peter | 310/113 |
| 5,262,693 A | * | 11/1993 | Holka | 310/121 |
| 5,442,250 A | * | 8/1995 | Stridsberg | 310/186 |
| 6,184,603 B1 | * | 2/2001 | Hamai et al. | 310/75 R |
| 6,208,036 B1 | | 3/2001 | Evans et al. | 290/46 |
| 6,528,918 B2 | * | 3/2003 | Paulus-Neues et al. | 310/75 R |

* cited by examiner

*Primary Examiner*—Thanh Lam
(74) *Attorney, Agent, or Firm*—Leslie C. Hodges

(57) ABSTRACT

A powertrain includes a rotary input member such as an engine crankshaft, a torque coupling such as a hydraulic torque converter, a drive plate, such as a flex plate or spider, connecting the input member to the coupling, and an annular generator rotor having an electrical power annulus, such as an annular induction member extending around the coupling, and a mounting ring fixed to the power annulus and including means extending inward for securing the mounting ring to the coupling and to the drive plate. Several embodiments of mounting rings and assemblies are disclosed which improve methods for assembly of the powertrain.

20 Claims, 4 Drawing Sheets

POWERTRAIN WITH MOTOR GENERATOR ROTOR HAVING TORQUE TRANSMISSION MOUNTING RING

TECHNICAL FIELD

This invention relates to a powertrain including an electric motor generator and to the manner of mounting the generator rotor.

BACKGROUND OF THE INVENTION

U.S. Pat. No. 5,103,127 Peter, assigned to the assignee of the present invention, describes a torque converter mounted starter/generator for a motor vehicle in which the rotor of the starter/generator machine is formed on the outer circumference of an input shell of a vehicle torque converter. The arrangement provides a compact assembly but substantially increases the complexity of the combined torque converter shell and generator rotor.

U.S. Pat. No. 6,208,036 Evans et al., commonly assigned, describes a vehicle powertrain with integrated motor generator wherein the generator rotor and the vehicle torque converter shell are independently connected with an engine crankshaft with the generator rotor essentially surrounding the torque converter. This arrangement substantially reduces manufacturing complexity although the difficulty of assembling the transmission and converter assembly to the engine is somewhat increased.

An improved arrangement providing both manufacturing simplicity and relative ease of assembly is accordingly desired.

SUMMARY OF THE INVENTION

The present invention provides an improved powertrain including a rotary input member such as an engine crankshaft, a torque coupling such as a hydraulic torque converter, a drive plate such as an automotive flex plate or connecting spider, and an annular generator rotor at least partially surrounding the torque coupling and connected with the coupling and the drive plate by a mounting ring forming a part of the rotor. The generator rotor includes an electrical power annulus, such as an annular induction member, and the mounting ring which is fixed to the power annulus for supporting the annulus and connecting it with the coupling and the drive plate.

In a preferred embodiment, the generator rotor is of the induction motor or generator type, although other forms of generator rotors could be utilized with the invention. The mounting ring, which forms a part of the generator rotor and supports the electrical power annulus, preferably includes two integral portions, namely an annular support and an annular connector. The annular support is a cylindrical portion on which the power annulus is mounted in any suitable manner, such as by a shrink fit. The annular connector may be formed as an inwardly directed flange which includes a plurality of openings for connection of the mounting ring with the converter and with the mounting plate.

Three examples of mounting ring configurations are disclosed including an angle ring, a T-ring and a C-ring, all referring to cross-sectional configurations of the various ring embodiments. In the angle ring, the annular connector or flange extends more or less radially inward from one end of the annular support or cylindrical portion. In the T-ring, the flange extends inward from a point between the ends of the cylindrical portion but closer to one end, and in the C-ring, the flange extends inward from the one end of the cylindrical portion.

In the angle ring and the T-ring, the flange is generally provided with three, or more, equiangularly-spaced openings which mate with openings in the drive plate and with drive lugs on the front of the torque converter shell. A peripheral flange on the drive plate may be used to assist in aligning the components during assembly. The drive plate is connected with both the generator rotor and the torque converter by bolts inserted through the three spaced openings in the flange and threaded into recesses in the torque converter lugs.

In the case of the C-ring, the flange is provided with two groups of three, or more, equiangularly-spaced openings alternating with one another around the ring. A first group has threaded nuts tack welded to the interior of the flange and bolts are inserted therein from the front or input member side of the drive plate to connect the rotor with the drive plate. A re-entrant rim on the interior edge of the flange guides on the torque converter lugs and assists in aligning the torque converter shell with the rotor during assembly of these components.

The mounting ring is connected to the converter lugs through the second alternate group of three, or more, openings in the mounting ring flange through which additional bolts are inserted from the input member or crankshaft side of the mounting plate through the mounting ring openings into threaded openings in the converter lugs. The arrangement simplifies connection of the generator rotor to the torque converter when the transmission is assembled to the engine.

These and other features and advantages of the invention will be more fully understood from the following description of certain specific embodiments of the invention taken together with the accompanying drawings.

DESCRIPTION OF THE PREFERRED EMBODIMENT

Figure 1:
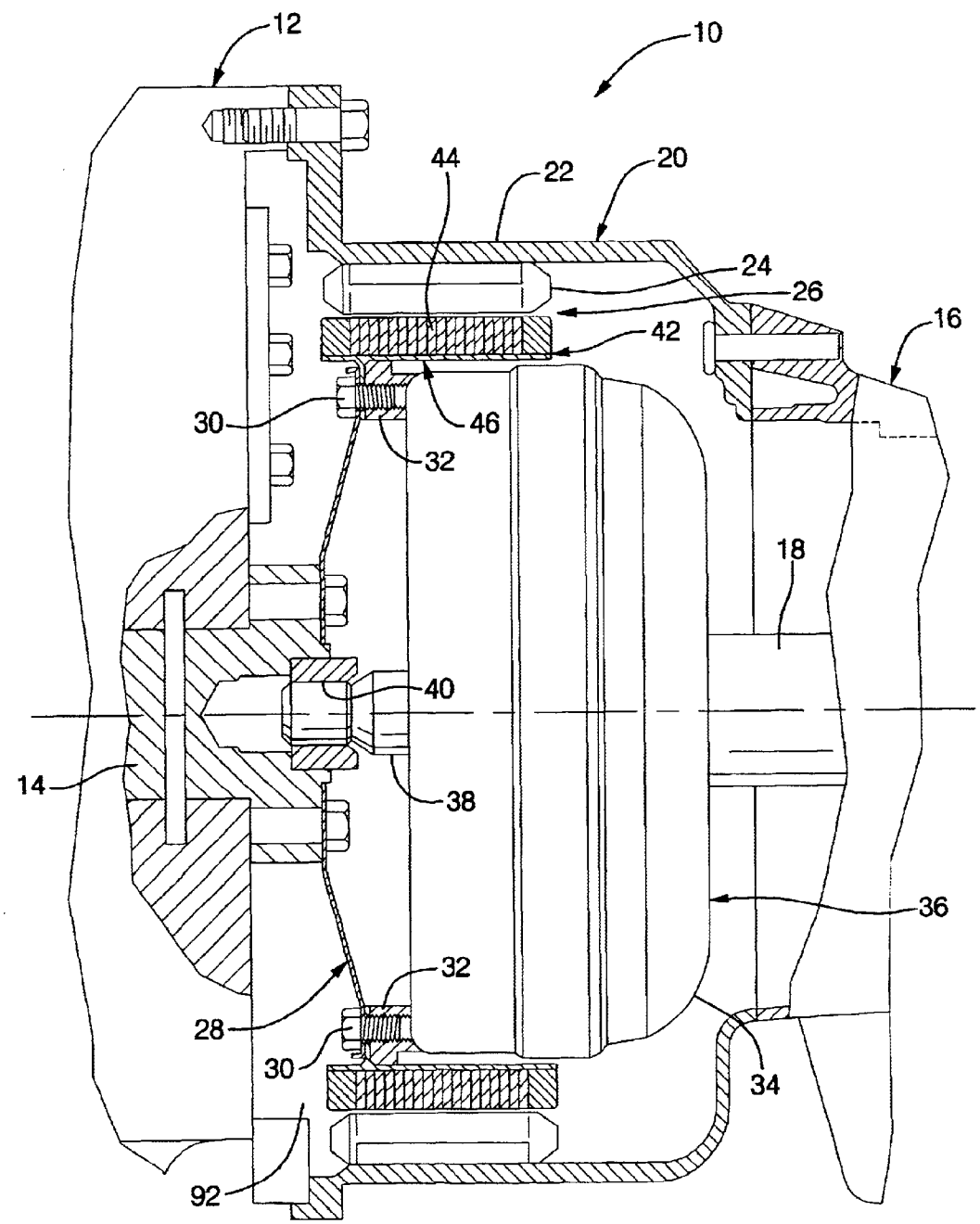
FIG. 1 is a side view partially in cross section showing a portion of a powertrain including an electrical generator rotor partially surrounding a torque converter at the connection between an engine crankshaft and a connected transmission.

Referring first to FIG. 1 of the drawings in detail, numeral 10 generally indicates an engine transmission assembly including an engine 12 having a crankshaft 14 forming an engine output shaft and a transmission 16 having an input shaft 18 connected by a powertrain 20 according to the invention.

Powertrain 20 includes a housing 22 which is mounted between the engine and the transmission and is assembled first to the transmission and subsequently bolted to the engine upon assembly of the transmission to the engine. The housing 22 internally mounts a stator 24 which forms a part of a motor generator 26 that forms a portion of the powertrain 20.

Within the housing 22, the powertrain further includes a drive plate 28 bolted to the end of the crankshaft 14 and connected by bolts 30 to annularly spaced drive lugs 32 welded to the input shell 34 of a conventional vehicle torque converter 36. The input shell 34 has a central protrusion that extends into a guide opening 40 at the end of the crankshaft 14 for supporting and maintaining alignment of the torque converter with the engine crankshaft. The torque converter 36 acts as a coupling between the crankshaft 14 with attached drive plate 28 and the input shaft 18 of the transmission.

In accordance with the invention, the motor generator 26 also includes an annular rotor 42 which, in the illustrated embodiment, includes an electrical power annulus 44 of the induction motor type, although other forms of generator rotors could be utilized in accordance with the invention. Rotor 42 further includes a mounting ring 46, shown also in FIG. 2 with other related portions of the powertrain.

Figure 2:
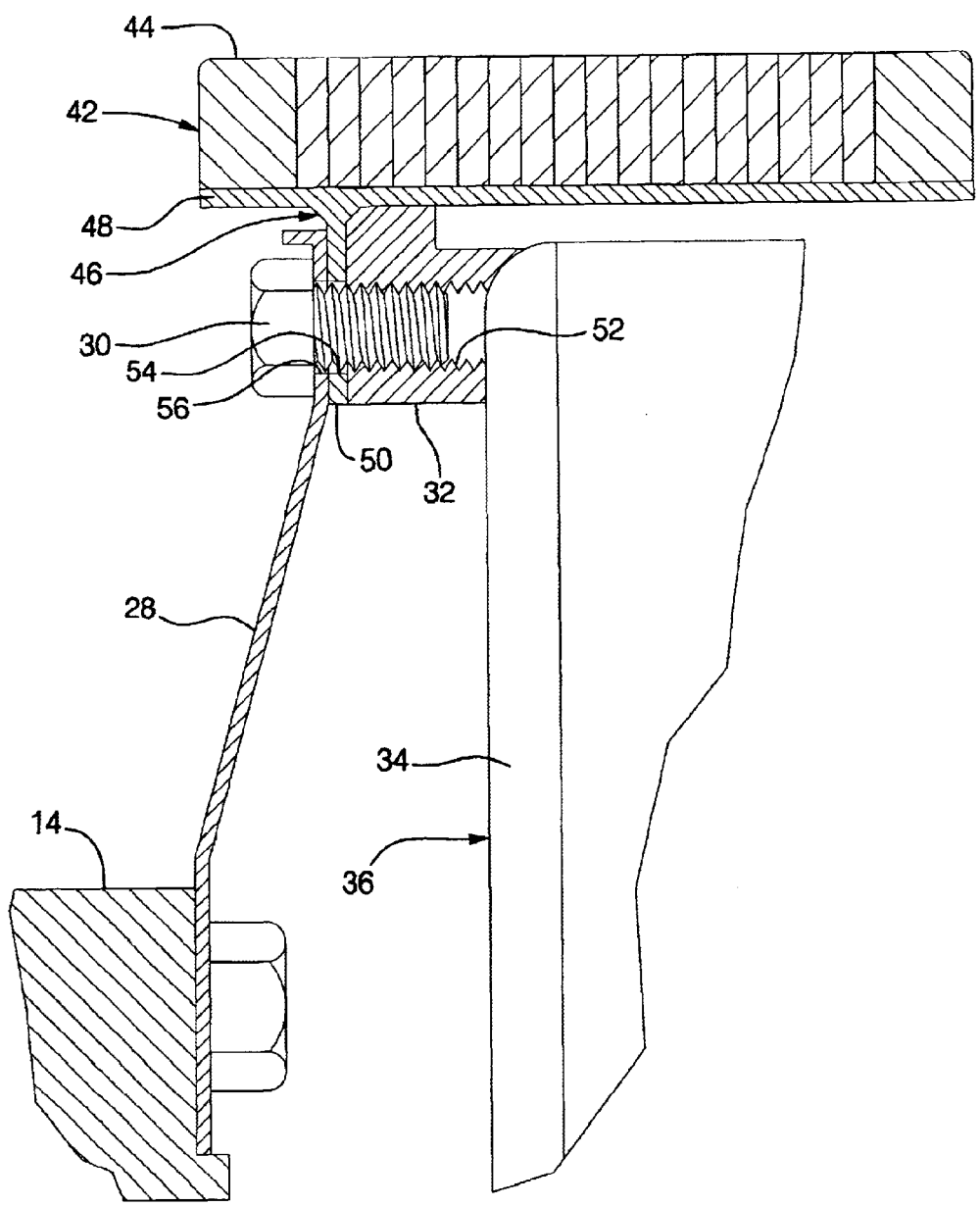
FIG. 2 is a cross-sectional view of a portion of the connection between the crankshaft, the torque converter and the rotor of the powertrain of FIG. 1.

As shown in FIG. 2, mounting ring 46 includes a generally cylindrical annular support 48 connected with a flange 50 which defines an annular connector. The power annulus 44 is preferably mounted on the cylindrical support by an interference fit so that the mounting ring 46 and the power annulus 44 are joined to form the annular rotor 42.

In the illustrated embodiment, the torque converter input shell 34 is conventionally provided with three drive lugs 32, each having a threaded bore 52 opening through a surface engaging the flange 50 of the mounting ring 46. Flange 50 also includes three equiangularly-spaced openings 54 which are aligned with the threaded bores 52 and with three equiangularly-spaced openings 56 formed near the outer periphery of the drive plate 28. Bolts 30 are installed from the input member or crankshaft side of the drive plate 28 and extend through the openings 56 and 54 of the drive plate and flange 50 to engage the threaded bores 52 of the drive lugs 32. Thus, in this embodiment, bolts 30 connect the drive plate with both the annular rotor 42 and the input shell 34 of the torque converter.

Figure 3:
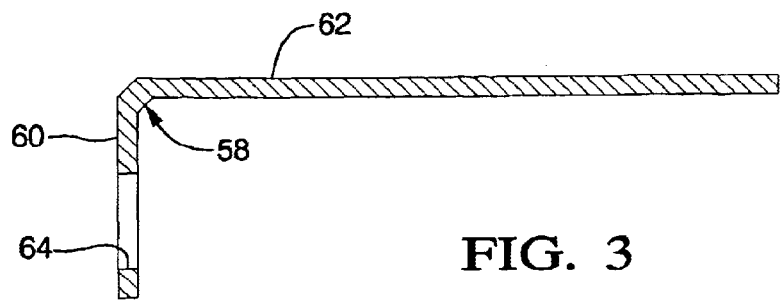
FIG. 3 is a cross-sectional view of an alternative angle ring.

The embodiment of FIGS. 1 and 2 illustrates a first embodiment of mounting ring 46 referred to as a T-ring, since the connection of the flange 50 with the annular support 48 is spaced inwardly from the forward end of the cylindrical support 48 so as to form a T-shape in cross section. FIG. 3 illustrates an alternative embodiment of mounting ring 58. This ring may be referred to as an angle ring because the connection of its annular connecter or flange 60 with its annular support or cylindrical portion 62 comes at adjoining ends of both elements so as to form in cross section an angle configuration. Three equiangularly-located openings 64 are provided in the flange 60 so that the mounting ring 58 could be substituted for mounting ring 46 in the embodiment of FIGS. 1 and 2 and the resulting rotor would be formed by mounting the power annulus 44 with an interference fit on the cylindrical annular support 62 of the mounting ring 58.

Figure 4:
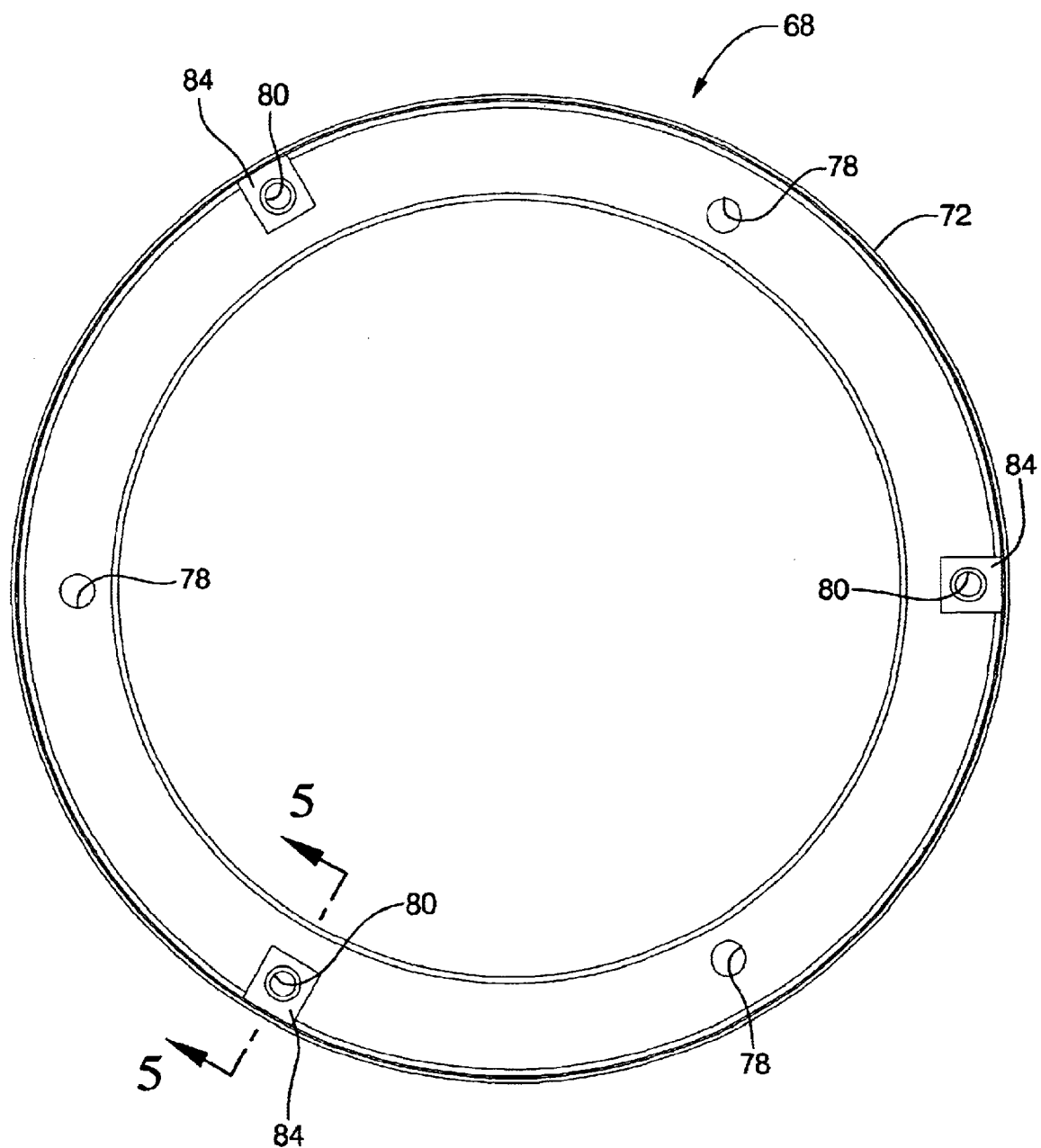
FIG. 4 is a rear view of a C-ring formed according to the invention.
Figure 5:
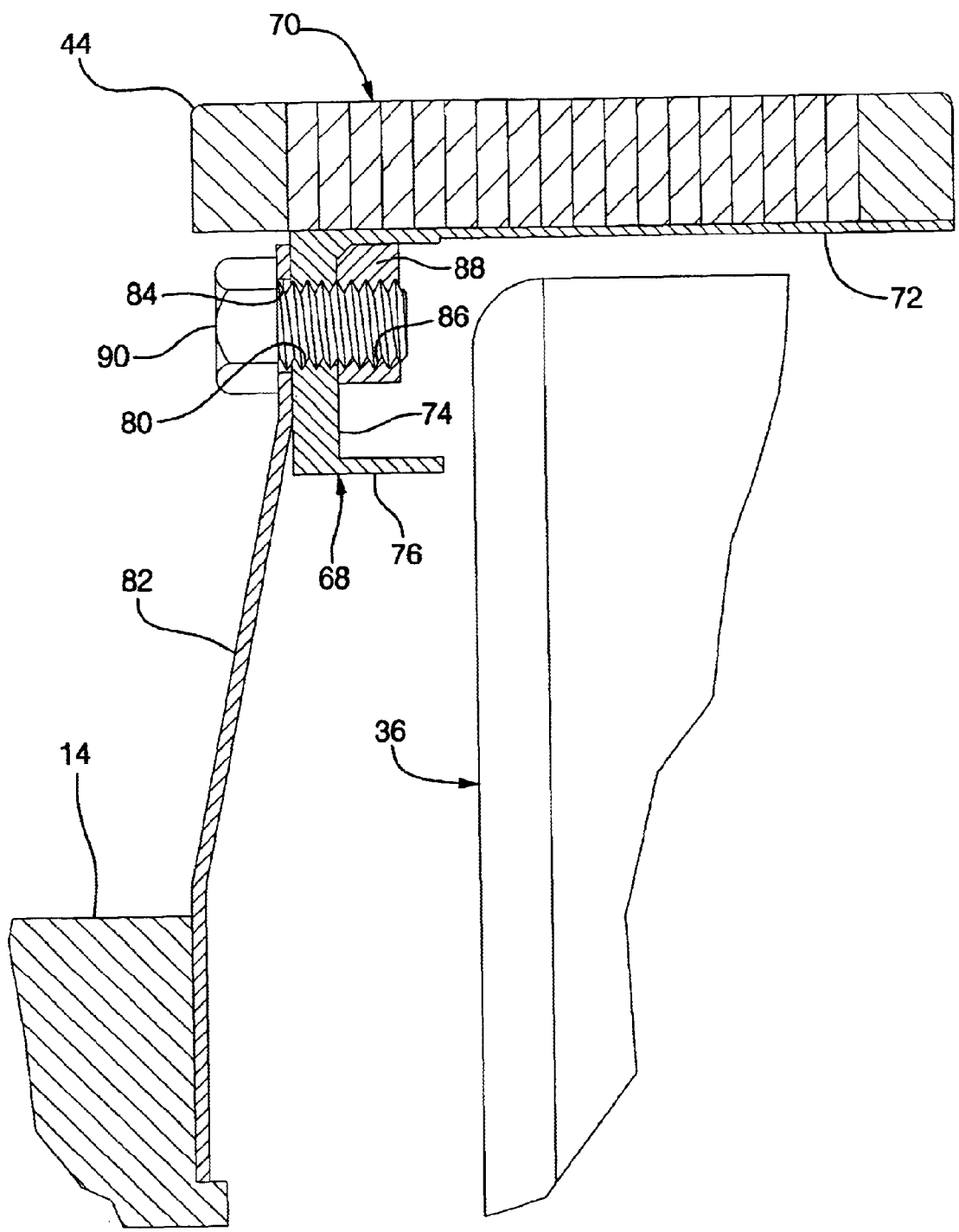
FIG. 5 is a cross-sectional view of the connection between the crankshaft and the rotor through the C-ring of FIG. 4.

Referring to FIGS. 4 and 5, a third alternative embodiment of mounting ring 68 is illustrated. FIG. 4 shows a rear view of the mounting ring 68 itself while FIG. 5 shows mounting ring 68 at a section indicated by the lines 5—5 of FIG. 4 and assembled with other elements of the drive train. These include the crankshaft 14 and an electrical power annulus 44 which is joined with mounting ring 68 to form an annular generator rotor 70. Mounting ring 68 is referred to as a C-ring in view of its cross-sectional configuration, which includes an annular support or cylinder 72, an annular connector or flange 74 extending inwardly at a right angle from the cylinder 72 and a re-entrant annular guide flange 76 extending rearward from the connector flange 74.

As shown in FIG. 4, mounting ring 68 is provided with six equiangularly-spaced openings formed in two groups of three openings each, including openings 78 positioned alternately with openings 80 comprising first and second groups of openings. Openings 78 are positioned to align with threaded bores 52 of the drive lugs 32, shown in FIG. 2 of the drawings, and with cutouts, not shown, in the drive plate 82. The mounting ring 68 is thus connected with the torque converter 36 in the same manner as in the embodiment of FIG. 2 except that the drive plate 82 is not connected to the mounting ring 68 at these locations.

Openings 80 are positioned to align with openings 84 of the drive plate 82 and also to align with threaded bores 86 of nuts 88 which are S welded to the flange 74 of the mounting ring. Bolts 90 are installed through openings 84 of the drive plate 82 and openings 80 of the flange 74 to engage the threaded bores 86 of nuts 88 so as to secure the drive plate to the flange 74 of the mounting ring or C-ring 68.

In assembly of a transmission having a drivetrain connection to an engine, the drive plate 28, 82 is first bolted to the end of the engine crankshaft 14. In the embodiments of FIGS. 2 and 3, the annular rotor 42 is mounted to the torque converter 36 with the openings 54 or 64 of the mounting ring flanges 50, 60 aligned with the threaded bores 52 of the drive lugs 32. The transmission and attached powertrain housing 22 and torque converter 36 are then secured to the engine and the bolts 30 are inserted through the opening 56 of the drive plate 28, 82 and then tightened by threading them into bores 52 of the drive lugs 32 on the torque converter input shell 34.

In order to reach the bolts 30, the assembler must reach through an opening 92, not shown, in either side of the lower portion of the housing 22. The heads of bolts 30 are located on the input member or crankshaft side of the mounting plate 28 so that the assembler can reach the bolt heads to tighten them in position. Completion of the operation requires rotation of the engine cranshaft and transmission in order that each of the bolts can be tightened in consecutive order.

Assembly of the embodiment of FIG. 5 differs somewhat and is more convenient. The drive plate 82 is bolted to the crankshaft 14 as before. However, the annular rotor 70 is first bolted to the torque converter 36 by inserting bolts 30 through openings 78 of the mounting ring 68 and tightening the bolts 30 into the threaded bores 52 of the drive lugs 32. Thus, the rotor 70 is fixed in place on the converter 36 before the transmission assembly is attached to the engine. Prior to installation of the bolts 30, the annular guide ring 76 on the C-ring or mounting ring 68 extends inside the drive tugs 32 of the torque converter and thus helps align the torque converter shell and the attached lugs with the drive plate 82. Installation of the bolts 30 is again accomplished by reaching through the opening 92 of the rotor housing 22.

Thereafter, the transmission housing 22 is attached to the engine and the openings 80 in the mounting ring are aligned with openings 84 in the drive plate. Bolts 90 are then installed from the crankshaft side of the drive-plate and tightened into threaded bores 86 of nuts 88 of the mounting ring 68 to connect the drive plate 82 with the rotor 70 and the torque converter 36. The assembly method substantially simplifies the alignment and connection of the crankshaft to the rotor and converter and reduces the time required for installing the transmission at an assembly station.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A powertrain including a rotary input member, a torque coupling, a drive plate connecting the input member to the coupling, and an annular generator rotor comprising:
    an electrical power annulus extending around the coupling; and
    a mounting ring having an annular support fixed to the power annulus and an annular connector extending inward from the support and including means securing the mounting ring to the coupling and to the drive plate.

2. A powertrain as in claim 1 wherein the mounting ring annular support is substantially cylindrical and is fixed to an inner surface of the power annulus and the annular connector is a flange.

3. A powertrain as in claim 2 wherein sad means for securing the mounting ring to the coupling and the drive plate include fastener receiving openings in the flange.

4. A powertrain as in claim 3 wherein the flange is connected to both the drive plate and the coupling by a fastener in each of the openings and installed from the input member side of the drive plate.

5. A powertrain as in claim 3 wherein the flange has first and second groups of angularly spaced openings, the flange being connected with the coupling by fasteners through the first group of openings and connected with the drive plate by fasteners through the second group of openings, and all the fasteners being installed from the input member side of the drive plate.

6. A powertrain as in claim 1 wherein the electrical power annulus is an induction ring.

7. A generator rotor comprising:
    an electrical power annulus; and
    a mounting ring having an annular support fixed to the power annulus and an annular connector extending inward from the support and including means for securing the mounting ring to a coupling a to a drive plate.

8. A generator rotor as in claim 7 wherein the electrical power annulus is an induction ring.

9. A generator rotor as in claim 7 wherein the mounting ring annular support is substantially cylindrical and is fixed to an inner surface of the power annulus and the annular connector is a flange.

10. A generator rotor as in claim 7 wherein said means for securing the mounting ring to the coupling and the drive plate include fastener receiving openings in the flange.

11. A generator motor as in claim 7 wherein said flange openings are each adapted for connection of the flange to both a torque coupling and a drive plate.

12. A generator rotor as in claim 7 wherein said flange includes first and second groups of angularly spaced openings, the first group being adapted for connecting the flange to a torque coupling and the second group being adapted for connecting the flange to a drive plate.

13. A mounting ring for an electrical power annulus, said ring comprising an annular support adapted to carry an electrical power annulus and an annular connector extending inward from the support and including means for securing the mounting ring to a coupling and to a drive plate.

14. A mounting ring as in claim 13 wherein the annular support is substantially cylindrical and adapted to be fixed to an inner surface of the power annulus and the annular connector is a flange.

15. A mounting ring as in claim 14 wherein the flange includes a plurality of mounting openings adapted for connecting the mounting ring with a torque coupling and a drive plate.

16. A mounting ring as in clam 15 wherein the mounting openings include first and second groups adapted respectively for connection with the torque coupling and the drive plate.

17. A mounting ring as in claim 14 wherein a longitudinal cross section of the ring forms an angle between the cylindrical support and the flange.

18. A mounting ring as in claim 14 wherein a longitudinal cross section of the ring forms a T configuration including the cylindrical support and the flange.

19. A mounting ring as in claim 14 wherein a longitudinal cross section of the ring forms a C configuration including the cylindrical support, the flange and a stiffening ring extending from an inner edge of the flange.

20. A powertrain including a rotary input member, a torque coupling comprising a hydraulic torque converter, a drive plate connecting the input member to the coupling, and an annular generator rotor comprising:
    an electrical power annulus extending around the coupling; and
    a unitary mounting ring having an annular support fixed to and carrying the power annulus and an integral annular connector extending inward from the support and including means securing the mounting ring to the coupling and to the drive plate.

* * * * *